(12) United States Patent
Stetten et al.

(10) Patent No.: US 9,024,874 B2
(45) Date of Patent: May 5, 2015

(54) FINGERTIP VISUAL HAPTIC SENSOR CONTROLLER

(75) Inventors: George DeWitt Stetten, Pittsburgh, PA (US); Roberta Klatzky, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 1644 days.

(21) Appl. No.: 12/044,138

(22) Filed: Mar. 7, 2008

(65) Prior Publication Data

US 2008/0226134 A1  Sep. 18, 2008

Related U.S. Application Data

(60) Provisional application No. 60/894,345, filed on Mar. 12, 2007.

(51) Int. Cl.
*G06F 3/01* (2006.01)
*G06F 3/03* (2006.01)

(52) U.S. Cl.
CPC ............ *G06F 3/014* (2013.01); *G06F 3/016* (2013.01); *G06F 3/0317* (2013.01); *G06F 3/0321* (2013.01)

(58) Field of Classification Search
CPC .... G06F 2203/0331; G06K 9/00; H04N 7/18; H04B 3/36
USPC ........... 340/4.12, 407.1–407.2; 345/156–158, 345/183–182
See application file for complete search history.

(56) References Cited

U.S. PATENT DOCUMENTS

| | | | |
|---|---|---|---|
| 5,971,279 A | 10/1999 | Raistrick et al. | |
| 5,986,643 A * | 11/1999 | Harvill et al. | 345/156 |
| 6,115,482 A * | 9/2000 | Sears et al. | 382/114 |
| 6,377,296 B1 * | 4/2002 | Zlatsin et al. | 348/143 |
| 6,738,041 B2 | 5/2004 | Silber | |
| 6,948,937 B2 | 9/2005 | Tretiakoff et al. | |
| 7,077,015 B2 | 7/2006 | Hayward et al. | |
| 7,106,313 B2 | 9/2006 | Schena et al. | |
| 7,559,895 B2 | 7/2009 | Stetten et al. | |
| 8,259,163 B2 * | 9/2012 | Bell | 348/51 |

(Continued)

OTHER PUBLICATIONS

C. Lenay, et al., Technology and Perception: the Contribution of Sensory Substitution Systems, IEEE, 1997, pp. 44-53, Universite de Technologie de Compiegne, BP 649-60206 Compiegne, France.

(Continued)

*Primary Examiner* — Kenneth Bukowski
(74) *Attorney, Agent, or Firm* — Klarquist Sparkman, LLP

(57) ABSTRACT

Systems, methods and devices for capturing environmental image data and providing tactile feedback about the visual environment to a user. One or more image sensing devices are mounted on various appendages of a user and are used to sense the environment. The image data is sent to a computer vision system where it is processed in order to identify specific objects within the environment. When the computer vision system makes such an identification it may send a signal to a haptic stimulator mounted on a user's appendage or may be used to control an object in the environment.

41 Claims, 4 Drawing Sheets

(56) References Cited

U.S. PATENT DOCUMENTS

| | | | |
|---|---|---|---|
| 2004/0189720 A1* | 9/2004 | Wilson et al. | 345/863 |
| 2005/0264527 A1 | 12/2005 | Lin | |
| 2006/0061545 A1 | 3/2006 | Hughes et al. | |
| 2006/0081714 A1 | 4/2006 | King et al. | |
| 2006/0098899 A1 | 5/2006 | King et al. | |
| 2006/0129070 A1 | 6/2006 | Pearl et al. | |
| 2006/0142657 A1* | 6/2006 | Quaid et al. | 600/424 |
| 2006/0209013 A1* | 9/2006 | Fengels | 345/156 |
| 2008/0218588 A1 | 9/2008 | Stetten | |

OTHER PUBLICATIONS

Zawrotny, K. et al., "Fingertip Vibratory Transducer for Detecting Optical Edges Using Regenerative Feedback", Haptic Interfaces for Virtual Environment and Teleoperator Systems, IEEE Virtual Reality 200, pp. 373-374, Mar. 2006.

* cited by examiner

FINGERTIP VISUAL HAPTIC SENSOR CONTROLLER

CROSS-REFERENCE TO RELATED APPLICATIONS

This application claims priority under 35 U.S.C. §119(e) to provisional application Ser. No. 60/894,345, filed Mar. 12, 2007, the contents of which are incorporated by reference herein in their entirety.

BACKGROUND OF THE INVENTION

1. Field of the Invention

The present invention relates generally to devices and methods for remotely sensing and controlling the environment, and, more specifically, the present invention is directed to visual sensing devices that provide tactile sensation of edges and objects in the environment and control of recognized targets in the environment.

2. Description of the Background

Devices that transfer input from the visual environment to another sense have been developed. For example, visually impaired individuals have been presented with a wide variety of devices that transfer to another sense at least some of the vision-related capabilities of normally-sighted individuals. The primary assistive technologies presently used by the blind to navigate through the environment are essentially unchanged from those used twenty years ago, namely, white canes and guide dogs. Although these two methods can provide the ability to travel safely in a wide variety of environments, neither provide the kind of assistance needed to straighten a picture frame on the wall or find a can of soup on a counter-top.

Electronic navigation aids are finding some acceptance, especially laser and ultrasound canes, as well as portable computers with global positioning systems (GPS) and electronic Braille or speech interfaces. Replacing the more general capabilities of vision to provide detailed information about objects in the environment has proven much harder.

Existing products capture an image and then display that image on a tactile screen that could be worn on a belt.

The fingers can then be used to interrogate the image depicted on the tactile screen in an effort to "visualize" the image depicted on the screen.

There are also a number of related technologies that monitor hand, eye, and body motion from a fixed camera to interpret gestures, commands, gaze direction. These are generally not worn by the operator and thus only operate within a limited space, focusing on the operator himself rather than his interrogation of whatever environment he happens to be in.

There exists a need, however, for a device that allows for active interrogation and sensing of the three dimensional environment surrounding the operator as he moves through daily life. There also exists a need for a device that not only allows the user to sense the environment but also provides control of specific aspects of the environment that are sensed by the device. There exists a need for a portable device providing this ability to interrogate and control the environment which is not limited to any specific environment. Through its many preferred embodiments, the present invention addresses one or more of the above limitations in the art to provide a variety of different sensing and control devices and methods for use as a surrogate for vision.

SUMMARY OF THE INVENTION

The present invention is directed to providing a user with the ability to sense visual input and control remote devices via the fingertip. In at least one preferred embodiment, a small image sensing device (such as a video camera or laser range finder) and a haptic stimulator (such as a small, mechanical vibrator) mounted on a fingertip provides tactile sensations given certain input to the image sensor. In one application, the image sensing device may be swept across a "field of view" and, when it encounters a known condition (such as sensing a physical edge), provides tactile feedback to the user through the vibrator mounted on the user's finger(s).

In one preferred embodiment, an image sensing device is mounted on the dorsal aspect (top) of one or more fingertips. Each of these sensors captures image data and communicates the image data to a computer vision system. Preferably, each image sensing device works independently, thereby providing the user feedback (and potential control) over a wide variety of situations at one time. The computer vision system processes the captured image data from each image sensing device according to preplanned or adaptive rules, and the system transmits a signal back to the haptic stimulator (which may also be mounted on the user's fingertip) corresponding to each respective image sensing device. Therefore, each fingertip is able to individually interrogate the three dimensional environment and receive feedback about what the finger "sees."

In some embodiments, the image sensing device may also be used to control remote devices via the fingertip. In these instances, the computer vision system can recognize specific targets (such as a light switch or lamp) which can be controlled by the flick of a finger or turn of the hand. The applications for both the sensing/recognition of real-world objects and conditions, as well as the control of the same, are almost limitless within the teachings of the present invention.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

The present invention, in at least one preferred embodiment, provides an image sensing device and haptic stimulator mounted on a user's fingertip or other appendage in order to facilitate a "visual" representation of the user's environment. Specifically, the image sensing device, which may be in the form of a miniature camera, laser range finder or other device, is aimed or swept throughout the environment by the user while it captures data about the environment. This captured data is sent to a computer processor (which may include a computer vision system) which is programmed to recognize certain environmental features (such as the edge of a doorway or a specific item) when these features are encountered within the field of view of the image device.

Upon detection, the computer processor then preferably signals back to the haptic stimulator (which may be mounted on the same finger as the image sensing device) causing a small, mechanical vibrator or other physical actuator (or any other method of communicating with the sensory system, such as through electrical stimulation or temperature) to pulse and alert the user that the environmental feature was detected. In a simple form, the image sensor/haptic stimulator may act as a "virtual cane" for the blind-sensing edges and obstructions in the environment. Through the use of more robust computer hardware and vision systems, the capability to recognize precise objects provides a greater degree of specificity. By building on the natural skills inherent to exploring the tactile environment with one's hands, the user will benefit from an ease of learning and interpretation when applying these skills to the visual environment.

Figure 1:
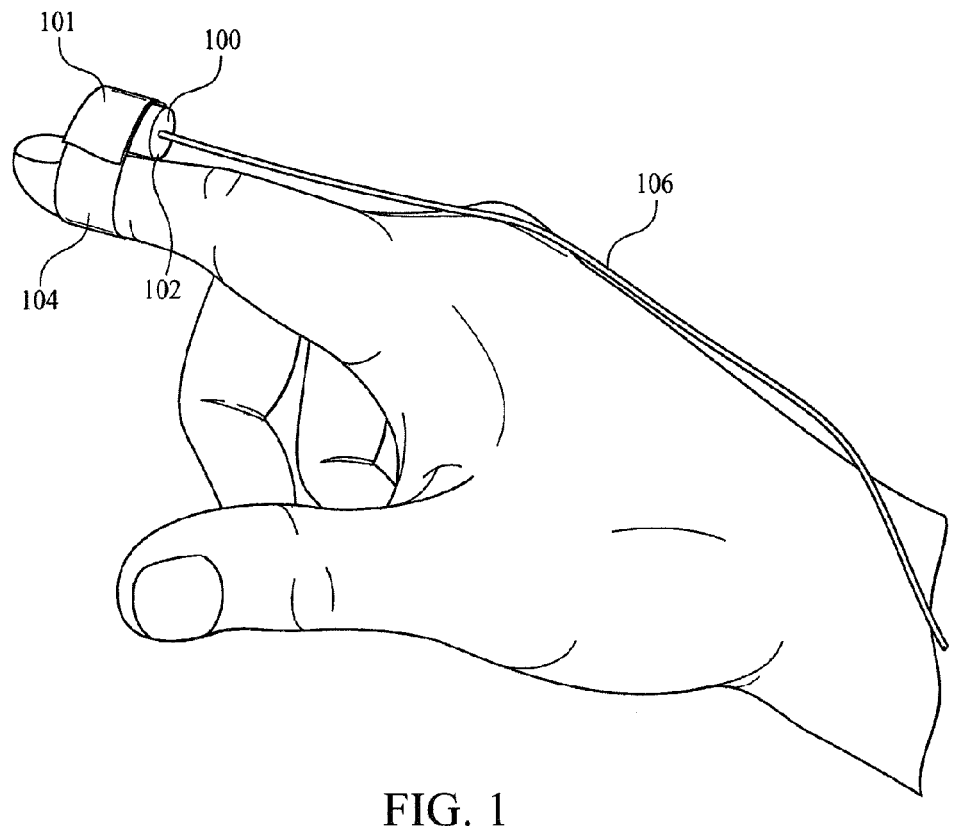
FIG. 1 is an enlarged perspective view of one embodiment of the present invention.

FIG. 1 shows an enlarged perspective view of one exemplary embodiment of the present invention 100 where the image sensing device is a camera 101. The camera 101 is shown mounted on the dorsal (top) portion of a finger with the image capturing field of view of the camera 101 extending out from the fingertip. As the user extends and sweeps the fingertip in front of the user, the camera collects either continuous or periodic (e.g., sampled) images that are sent to a separate processor (described below).

The device 100 of FIG. 1 also shows a haptic stimulator 102 mounted below the camera 101. The haptic stimulator 102 is preferably mounted to the same fingertip as its corresponding image sensor 101, and, more specifically, to the top surface of the fingertip (dorsal aspect of the distal phalanges) leaving the distal and ventral aspects free to be used in normal touching and gripping. In this embodiment, the camera 101 and haptic stimulator 102 are attached to the finger by an elastic cuff 104, which encircles the finger at the distal interphalangial joint. Other attachment mechanisms could be used, as understood by those skilled in the art, such as an adhesive to attach to the fingernail.

The image sensing device (camera) 101 and haptic stimulator 102 are preferably connected to a computer processor or computer vision system (shown in FIG. 4) by a communication link 106. The communication link 106 may be a wire as depicted in FIG. 1 or could be any type of wireless or other communicative connection. Through this communication medium, the signal from the image sensing device 101 may be transmitted to the processing system. Likewise, after the sent image data is processed by the computer vision system, a responsive signal may be sent from the computer processor back to the haptic stimulator over the same communication medium to mechanically actuate the stimulator against the user's fingertip (as described below). The computer vision system could also be miniaturized sufficiently so that it could be mounted on the finger along with the camera and haptic stimulator, eliminating the need for a communication system.

Multiple transmitters and receivers may exist on the device worn by the user to relay signals between the image sensing device, computer vision system and haptic stimulator. Likewise, multiple transmitters and receivers may also exist in the environment to relay control signals to and from remotely controlled targets in the environment.

Audio transmitters and receivers may also exist on the device to audibly alert the user of specific features and targets in the environment and to allow the user to communicate with the device by voice command. Thus, a user can verbally communicate to the finger a specific feature or target in the environment that the user desires to locate. The user can then move his fingers over the environment and receive an audio communication back from the finger once the specific feature or target in the environment is detected. The user may also be alerted through the haptic stimulator when the specific features or targets are identified in such a way that their location may be determined and/or control over them may be exerted.

The Image Sensing Device

Figure 2:
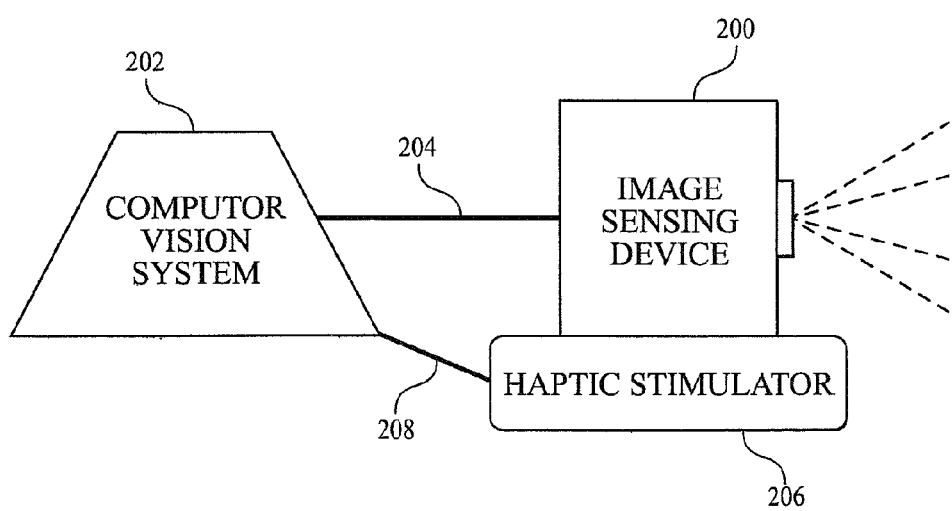
FIG. 2 is a block diagram of the invention.

FIG. 2 depicts a simplified block diagram of one preferred system according the present invention. As shown in FIG. 2, an image sensing device 200 is in communication with a computer vision system 202 via a communications link 204. The image sensing device 200 captures visual features in the environment. The image sensing device is any device that captures information about points in space along a set of projected lines, such as a video camera. The image sensing device may also capture information about range along each line, as in the case of a laser rangefinder, set of stereo cameras, or sonar scanner. Other devices such as infrared cameras and range finders or still cameras with rapid image capture may also be utilized. The image sensing device encompasses any modality that interrogates space relative to the location of the fingertip.

One preferred example of an image sensing device 200 is a video camera. Video cameras are well known devices used to capture images. The first cameras were relatively large devices and cumbersome to use. Currently, miniature cameras are common, and are small enough and light enough to be mounted on a fingertip.

A camera captures the visual environment and converts the three dimensional world into a two dimensional image map made up of numerous pixels. The signal from the image sensing device 200 is then transmitted to a real-time computer vision system 202 where the pixels are analyzed to detect a particular feature, such as an edge with a particular orientation across the center of the image, or to identify certain targets in the image, such as a coffee cup.

There are various ways in which to implement the imaging sensor as a camera or other device. As shown in FIG. 1, the image sensing device could be a miniature camera.

For example, the image sensing device could be a very small (e.g., ¼" by ½") video camera mounted to the fingertip. However, in its simplest form, the image sensing device could be a miniature single pixel sensor that focuses on a single pixel of an image. This could be as simple as a lens with a pinhole at the plane of focus, behind which a photosensor would detect only that particular location in the image. Such a sensor may be cheaper and smaller than an entire camera, and with motion of the camera could report a temporal signal that could be processed to accumulate and identify spatial patterns such as edges. Alternative means of implementing the image sensing device include a laser (or laser range finder) or ultrasonic transducer.

The Computer Vision System

Figure 3:
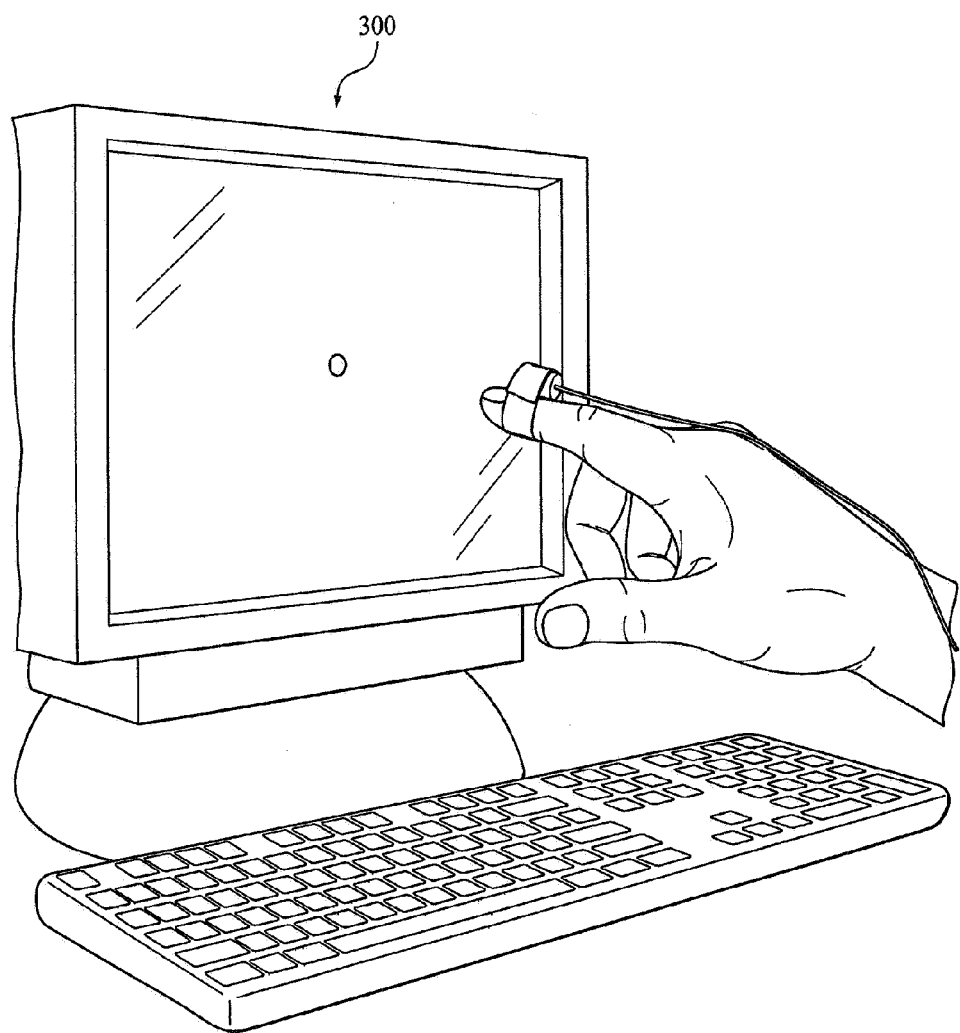
FIG. 3 shows a computer vision system.

Computer vision systems are well known in the art and allow for perception of information from image sensing devices. FIG. 3 shows one exemplary computer vision system that may be used as part of the present invention. While the computer vision system 300 depicted in FIG. 3 is a conventional desktop computer, the computer vision system of the present invention may include any image processing system including, for example, laptop computers and handheld or pocket devices. In some embodiments, the computer vision system may be a specially programmed microprocessor embodied in a portable device that may be worn by the user during use, or mounted directly on the finger with the image sensing device.

Computer vision is a well-established and broad field with many techniques that may be applied to the present invention, such as optical flow, feature analysis, target recognition. Any and all aspects of the computer vision field may be utilized in connection with the fingertip image sensing device.

Referring back to FIG. 2, the computer vision system 200 receives a signal 204 from the image sensing device 200 which includes visual images of the environment. The computer vision system 202 uses a vision algorithm to obtain information from images of the environment or other sensory data received from the environment. The images or sensory data are processed by the computer vision system 202, and the computer vision system detects features in the environment. These features are localized areas having particular characteristics such as an edge, a color, or texture. The computer vision system 202 may also detect entire targets in the environment that it is programmed to identify.

For example, a computer vision system 202 may identify edges in the environment such as door frames, tables and countertops, or objects such as a coffee cup or pencil. In addition, the computer vision system may be programmed to identify specific targets such as a light switch, lamp or television set. These targets may also include a dot, cursor, bar, icon, or other pattern on a computer screen of other type of monitor (as described in more detail below) or specific targets in open surroundings such as markers, buoys, or a lighthouse. As is known in the art, the capabilities of computer vision systems are expansive; such systems allow for detailed perception of the environment such as face recognition and optical character recognition.

Several techniques have been well explored in computer vision for identifying targets in the environment, including combining features with particular geometric relationships, as well as image-matching schemes based on libraries of pre-recorded images of many different targets, to name just two. These and other techniques that are readily understood by those skilled in the art could all be utilized as part of the present invention.

The computer vision system of the present invention may receive instructions as to specific features to identify in the environment at any given time. The identifying features of certain detectable objects may be preprogrammed in the computer processor or vision system, and others may be programmed based on the use of the system by a particular user at any time. These instructions may be input into the computer vision system manually, such as by keyboard, by voice command from the user, or by other means including motions of the hand and fingers. Changes in the features and targets to be identified may also be automatically controlled given, for example, the location, time of day, or mode of user operation.

For example, a user may be able to verbally say the word "pencil" as a way of commanding the vision computer system to detect a pencil in the environment. The computer vision system will then process images being received from the image sensing device and identify any pencils in the environment (e.g., by matching the received image data to stored data about a pencil). If a pencil is detected, the computer vision system can transmit a signal to the haptic stimulator mounted on the fingertip causing it to vibrate. Location within the image relative to the central pixel (direction of finger pointing) may be encoded in the haptic feedback, or otherwise communicated to the user, so as to permit "homing in" on the target (such as a pencil) without initially having to have been pointing directly at it.

Certain targets may also be used as navigational beacons, providing the user with detailed information of his/her location relative to the beacon, including distance and orientation. This technology is well known to the field, and includes special graphical patterns designed to permit the extraction of such distance and orientation information of the video camera from the image captured by the camera. Thus the user could know where he/she is with respect to a target within a room and receive feedback helpful to navigation. For example, if these targets were on a computer display, they could be adaptive, facilitating effective localization of the camera. Active light-source arrays, well known to the field, could also serve as effective targets for this purpose, given the appropriate camera system.

Tactile Sensation Output (The Haptic Stimulator)

As described above, and shown in FIG. 1, a haptic stimulator (most simply, a vibratory transducer) is preferably mounted to a fingertip, and, more specifically, to the top surface of the fingertip (dorsal aspect of the distal phalanges). When the computer processor detects an environmental feature or object for which the user is searching, the processor sends a signal to the appropriate haptic stimulator which then provides the user tactile feedback about the user's visual environment.

Referring to FIG. 2, the haptic stimulator 206 is connected to the computer vision system 202 by a communication link 208 which may take the form of any wired or wireless communications medium, or as described previously the computer vision system could be miniaturized to fit on the finger, eliminating the need for the communication system. When an edge, object or other programmed feature or target in the environment is identified by the computer vision system 202, the computer vision system transmits a signal via communication link 208 to the haptic stimulator 206 attached to the finger causing the stimulator to vibrate.

Haptic devices beyond simple vibratory transducers have been developed and may be utilized as a haptic stimulator, including devices based on multiple vibratory "pins" and ones that move a looped or spherical surface repeatedly past the fingertip as the fingertip moves to simulate motion across a stationary surface. Direct electrical stimulation has also been used, as well as transducers that change temperature. Other embodiments may include pneumatic devices having an array of tiny holes that blow air across the fingertip making waves that create the perception of moving textures.

One significant feature of the present invention is that it allows for independent interrogation of the environment by multiple fingers simultaneously. Each fingertip is able to do its own interrogation of the environment. Each fingertip having an image sensing device and haptic stimulator is preferably treated separately by the computer vision system, which permits potentially up to ten or more image sensing devices to be used simultaneously. The computer vision system may take advantage of the multiple images to combine information in useful ways, such as to interpret the relative orientations of the fingertips and to enlarge the overall understanding of the environment. Such haptic stimulators mounted on multiple fingers may give a coordinated sense that can be quickly swept through the environment using motions of the hands and fingers.

Using multiple image sensing devices together could also allow a user to more easily determine the orientation or shape of an edge or object in the environment. For example, if the haptic stimulators are made to vibrate when finding an edge with a given orientation, by rotating the hand around the target object remotely or moving the fingers, a user can determine whether the detected edge is a horizontal or vertical edge such as those edges representing doorways or tables, or determine whether the shape of an object on a desk was square or round.

A user wearing multiple image sensing devices can also search the environment for multiple features simultaneously. For example, a user can program the computer vision system to utilize the image sensor on the right index finger to search for a "pencil" and the right middle finger to search for a "coffee cup" (e.g., by using a voice command to the vision system. Then, by waving the right hand throughout the environment, the user simultaneously searches for both items at the same time. As each item is detected by the vision system, the appropriate haptic stimulator (right index finger for "pencil" and right middle finger for "coffee cup") will be actuated. By using voice commands to continually change the "object" for which each finger is searching, a very complex and flexible visual search system may be employed through the use of the present invention.

Controller

In addition to, or as an alternative to, providing tactile sensation, the image sensing device according the present invention can be used to control remote targets in the environment. The controller preferably operates in conjunction with the haptic stimulator, though the haptic stimulator is not necessary for operation of the controller. Embodiments may include both the haptic stimulator and controller to provide the user with both tactile sensation and control of features in the environment.

The location of targets in the environment is captured by the image sensing device and recognized by the computer vision system according to the methodology set forth above. However, when the image sensing device is pointed at a specific target that has been located, control signals can be generated by specific motions of the image sensing device (e.g., bending a finger up and down) that control aspects of the environment (e.g., turning a light switch on and off). Such motions may be determined from the image itself, or in addition, or instead, by other sensors on the finger including inertial or joint-angle sensors as are well known in the field.

The control features of the device are practically unlimited. For example, the controller may be used simply to control a cursor on a computer screen by movement of the finger. Or, in more complex embodiments, the controller may involve pointing all of the fingers at a robot to control the robot like a puppet by movement of the fingers.

In the simple scenario of the cursor, the controller can keep the cursor with the same location and orientation with respect to the camera's field of view. Thus the curser moves with the finger. The controller may move the cursor around the screen, or the cursor may move as a slide pot so that when the finger moves side to side the cursor on the screen moves side to side along a line, or the controller may be used as a virtual knob that determines and controls the angle of a cursor shaped like an arrowhead.

The concept of control could involve special targets that would be recognized by a computer vision system that is connected to the image sensing device, such that when the finger is pointed at the target, the control signals could be issued by specific motions of the image sensing device.

As one example, the image sensing device could be a fingertip camera connected to a computer vision system and the target could be a computer screen containing a dot that could be moved by the fingertip using a control feedback loop to keep the dot in the center of the camera image. In this example, the computer vision system uses an algorithm to identify the dot on a computer screen, and to control the location of that dot by moving the dot in order to maintain the dot in the center of the camera's field of view. Thus, movement of the fingertip camera will cause the dot to move around on the screen.

As described above, this aspect of the invention can be implemented with a camera as the image sensing device. The miniature camera is mounted to the fingertip of the user and when pointed at the dot, the dot is detected by the computer vision system. The computer vision system then locks onto the dot and causes the finger to vibrate via the haptic stimulator indicating that the dot is locked. The location of the dot can then be controlled remotely by the user by movement of the finger.

As one example of this implementation, the camera can be pointed at a black computer screen having a single white dot at the center point of the screen. The center point of the camera image may be designated as coordinates (0,0). Taking an image from the camera, the computer vision system can examine each pixel on the cameral image and identify the dot by determining the pixel with maximum brightness. This point is then designated as coordinates delta X, delta Y. By causing the dot to move by −delta X, −delta Y, the computer can place the dot in the center of the camera image. If this is done repeatedly as the camera moves, the dot will effectively track finger movement and continually move to where the finger is pointing. If the finger moves beyond edge of the screen, the dot may be placed back to its original center point on the screen or remain at the edge of the screen nearest to where the finger moved past edge of the screen. Many variations are possible. For example, the dot can be a single pixel, a clump of pixels, or a blur. Haptic feedback can be supplied as to whether tracking is occurring.

The control aspect of the invention may be applied to any number of targets recognized by the computer vision system. For example, the dot could be a bar that can be rotated by turning the hand which in turn rotates the camera attached to the fingertips. Such rotation of the bar could be linked to specific lighting or a dimmer switch and thus act as a dimmer dependent on the extent that the bar is rotated. Other such commands can be located on the screen and programmed into the computer vision system.

Another implementation could utilize an actual light switch or lamp rather than a computer screen. The computer vision system could detect a specific light switch, lamp, television set, or any other mechanical or electronic device that is captured by the image sensing device. Once captured, the finger would vibrate via the haptic stimulator, and then a flick of the finger or turn of the hand could generate a control signal to manipulate the target device, so as to turn the target device on or off, adjust its volume, change the station if the target device is a television or radio, or any other functionality of the target device. This aspect of the invention can be extended to many other real world mechanical or electronic manipulations including remote sensing and control of video games or other types of multimedia.

For example, in the case of controlling a light switch, the light switch could, but would not itself have to be an active device that is directly controlled by the controller. The light switch need only be a target visually recognizable by the vision computer system. The controller can then communicate with a responsive control system in the light switch or a separate control system, such as a circuit to dim the lights, to effect control over the system and turn the lights off or on or adjust brightness of the lights.

Other Exemplary Embodiments

Figure 4:
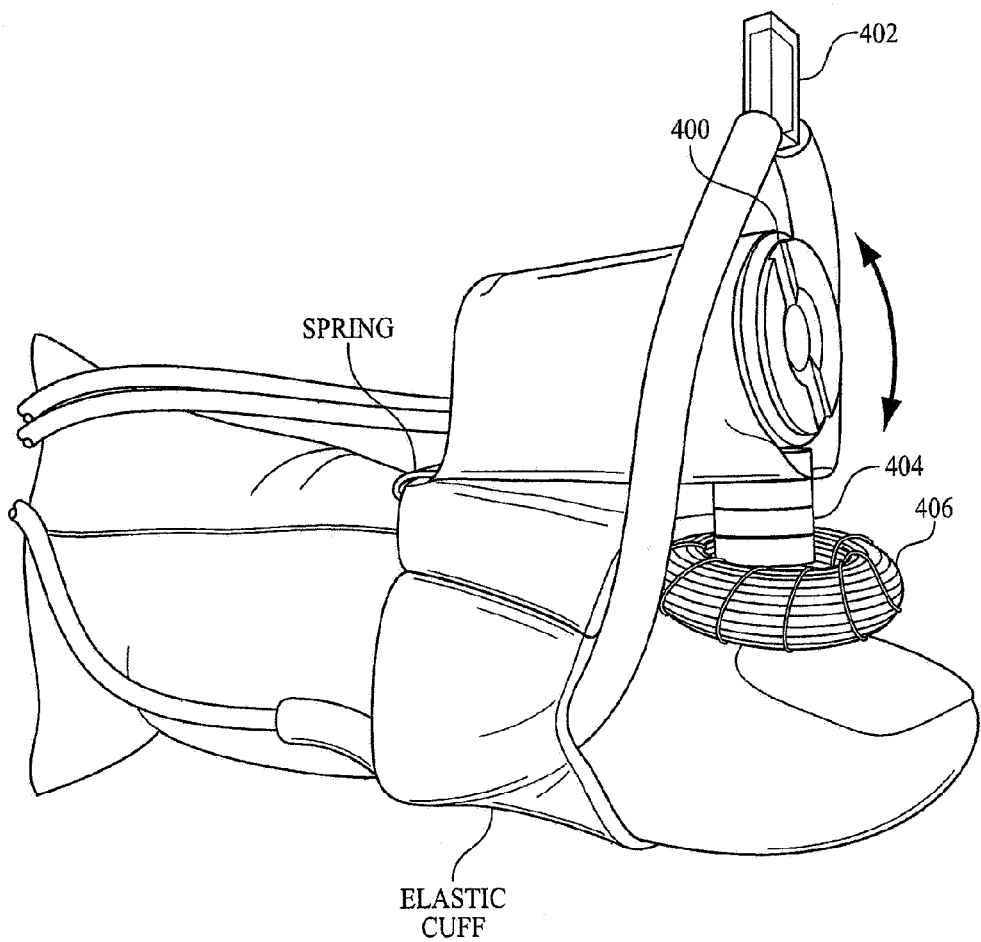
FIG. 4 shows an enlarged perspective view of another embodiment of the invention using a laser as the image sensing device.

FIG. 4 depicts an exemplary embodiment of the invention that uses a laser as the image sensing device. In this embodiment, the image sensing device is a laser 400 that is used to illuminate features in the environment and the reflections from the laser are detected by a phototransistor 402 attached to the laser 400. Attached to the underside of the laser 400 are miniature magnets 404 and a coil 406 which cause the laser 400 to vibrate when activated by reflections detected by the phototransistor 402 when features are identified in the environment.

Figure 5:
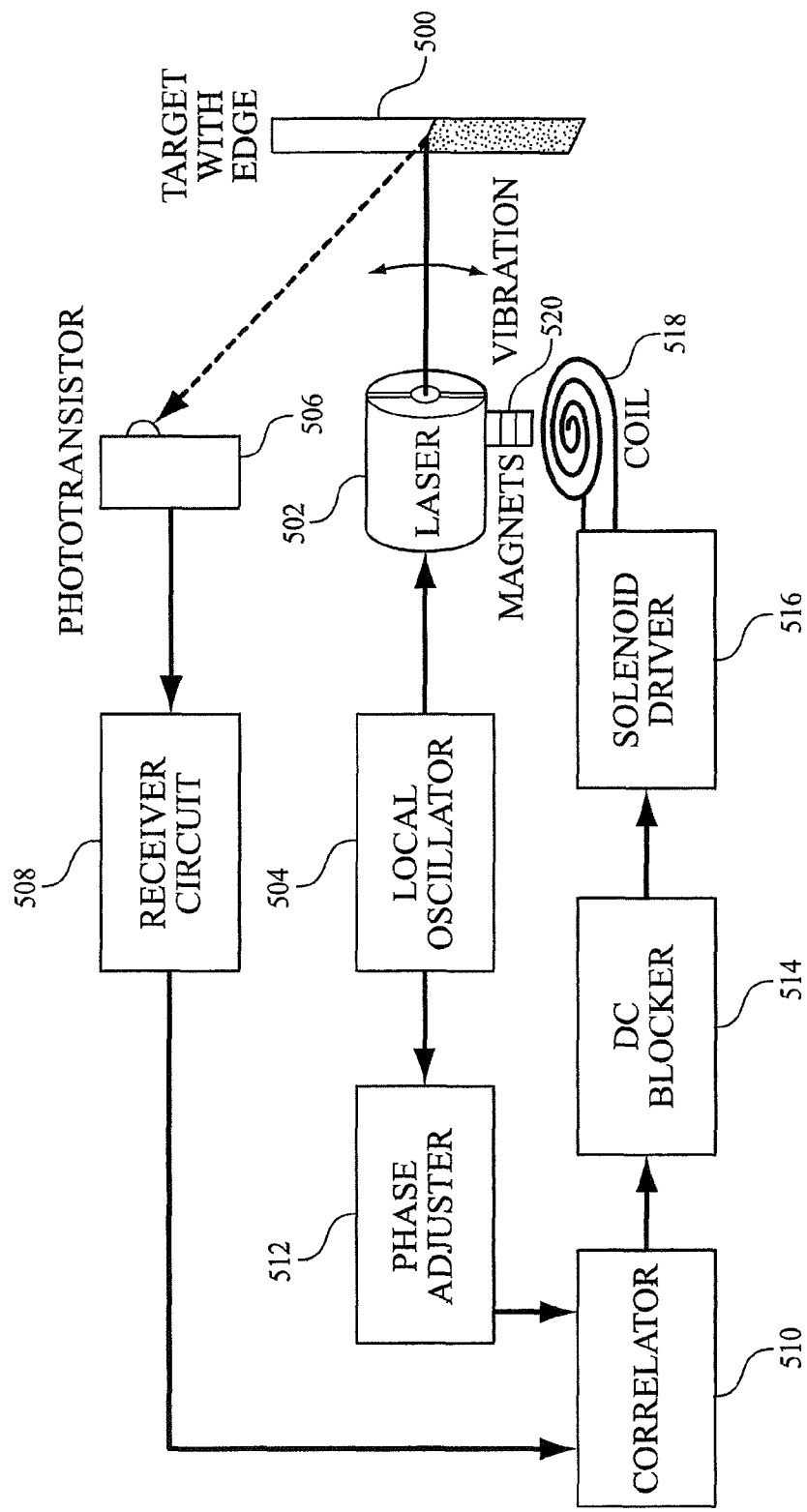
FIG. 5 is a block diagram for the system shown in FIG. 4.

FIG. 5. depicts a block diagram of the system shown in FIG. 4. In this embodiment, a target having an edge 500 is depicted as an abrupt transition between black and white regions. To avoid interference from ambient light, the laser 502 is modulated with a local oscillator 504 such as a 10 KHz square-wave oscillator. Reflected laser light is detected using a phototransistor 506 and the signal is filtered and amplified by a receiver circuit 508. Since both the frequency and phase of the modulated laser signal are known, autocorrelation using a correlator 510 can be effectively used to detect its presence in noise. The phase of the local oscillator 504 is adjusted empirically by a phase adjuster 512 to optimally compensate for phase shifts in the overall system, and the DC component of the autocorrelation is blocked by a DC blocker 514 leaving only the changes caused by movement across the optical edge 500. These changes are used to power a solenoid driver 516 (consisting of a coil 518 mounted on the fingertip and a stack of miniature magnets 520 attached to the laser) to produce vibration via regenerative feedback in the laser when a properly oriented edge is found.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A visual sensing and control system, comprising:
a first image sensing device, adapted to conduct measurements of an environment surrounding a user and generate image data based on said measurements;
a first controller associated with said first image sensing device;
a computer vision system in communication with said first image sensing device and first controller, wherein said computer vision system receives image data from said first image sensing device, further wherein said computer vision system is adapted to process said image data to recognize an object based on its texture and three-dimensional shape located at a location in said environment and sends a first signal through said controller to operate the recognized object, the operation occurring at the location of the recognized object; and
a haptic stimulator in communication with computer vision system, wherein said haptic stimulator is adapted to generate a haptic stimulus upon receipt of a second signal from said computer vision system, wherein said computer vision system is adapted to generate said second signal upon recognition of said object.

2. The system according to claim 1, wherein the first image sensing device is a video camera.

3. A visual sensing and tactile stimulation system, comprising:
a first image sensing device which transmits image data corresponding to three-dimensional objects in an environment surrounding a user, the first image sensing device configured to collect and transmit image data for multiple images of three-dimensional objects corresponding to different locations of the image-sensing device as the image-sensing device is moved in three-dimensional space;
a first haptic stimulator associated with said first image sensing device; and
a computer vision system in communication with said first image sensing device and first haptic stimulator, wherein said computer vision system receives the image data from said first image sensing device, compares the image data to stored data of a predetermined three-dimensional object, and sends a first signal to said first haptic stimulator when said received image data corresponds to the predetermined three-dimensional object, wherein said haptic stimulator is adapted to provide a haptic stimulus after receipt of said first signal from said computer vision system.

4. The system according to claim 3, further comprising:
a second image sensing device; and
a second haptic stimulator associated with said second image sensing device, wherein said second image sensing device and second haptic stimulator are in communication with said computer vision system.

5. The system according to claim 3, wherein the first image sensing device is a video camera.

6. The system according to claim 3, wherein the first image sensing device is a laser range finder.

7. The system according to claim 3, wherein the first haptic stimulator is a vibratory transducer.

8. The system according to claim 3, wherein the first haptic stimulator is a pneumatic device.

9. The system according to claim 3, further comprising a plurality of navigational beacons.

10. A method for providing information about the physical structure of a three-dimensional environment of a user, comprising the steps of:
gathering image data about the three-dimensional environment surrounding said user using an image sensing device mounted on an appendage of said user;
communicating the image data to a computer vision system;
processing the image data by the computer vision system to identify features of a non-textual three-dimensional object in the three-dimensional environment;
creating a signal based on said processing step; and
transmitting a signal to a haptic stimulator mounted on said user to provide a haptic representation of the three-dimensional environment, wherein said haptic representation of the three-dimensional environment includes information about said features found in the environment;
wherein the act of gathering image data comprises moving the image-sensing device in three-dimensions, collecting data for multiple images corresponding to different locations of the image-sensing device as it is moved in three-dimensional space;

wherein the act of processing the image data comprises processing the image data of the multiple images, comparing the image data of the multiple images to predefined features of the three-dimensional object in a database to identify the features of the three-dimensional object.

11. A method according to claim 10, wherein the image sensing device and haptic stimulator are mounted on the dorsal aspect of a fingertip.

12. A method according to claim 10, wherein said processing step identifies edges or obstructions of the three-dimensional object in the environment, and further wherein said transmitting step includes transmitting signals to the haptic stimulator when edges or obstructions in the environment are identified.

13. A method according to claim 10, wherein the features in said processing step are selected from said database via voice command.

14. A method according to claim 10, further comprising transmitting a command signal from said computer vision system to a controller associated with the object in the environment.

15. A method according to claim 10, wherein said appendage is a finger and the image sensing device is mounted on the dorsal aspect of said finger.

16. A method according to claim 10, wherein said step of gathering image data includes gathering image data using a plurality of image sensing devices mounted on said user.

17. A method according to claim 16, wherein said step of processing the image data includes the computer vision system identifying a different feature of a different three-dimensional object in the environment for each of said plurality of image sensing devices.

18. The method of claim 17, wherein the different features of the three-dimensional objects identified by the plurality of image sensing devices are located at different physical locations.

19. The method of claim 10, further comprising:
transmitting instructions from the user to the computer vision system to search the environment for a specific three-dimensional object.

20. The method of claim 10, wherein the act of processing the image data comprises recognizing a three-dimensional object based on its shape.

21. The method of claim 10, wherein the act of processing the image data comprises recognizing a piece of furniture or a three-dimensional portion thereof.

22. The method of claim 10, wherein the act of processing the image data comprises recognizing an appliance or a three-dimensional portion thereof.

23. The method of claim 10, wherein the act of processing the image data comprises recognizing a light switch.

24. The method of claim 10, wherein the three-dimensional environment comprises an open, outdoor environment.

25. The method of claim 24, wherein the outdoor environment comprises a surface of a body of water, and wherein the act of processing the image data comprises recognizing a nautical navigational beacon.

26. The method of claim 10, wherein the act of processing the image data comprises analyzing the environment to detect at least one predefined feature which is selected from the database.

27. The method of claim 10, wherein the database houses a plurality of predefined objects associated with the predefined features.

28. The method of claim 15, wherein the act of gathering image data comprises waving the finger in three-dimensions within the environment to recognize the three-dimensional object.

29. A method for providing information about the physical structure of a three-dimensional environment of a user, comprising the steps of:
gathering image data about the three-dimensional environment surrounding said user using an image sensing device mounted on an appendage of said user;
communicating the image data to a computer vision system;
processing the image data by the computer vision system to identify features of a three-dimensional object in the three-dimensional environment;
creating a signal based on said processing step; and
transmitting a signal to a haptic stimulator mounted on said user to provide a haptic representation of the three-dimensional environment, wherein said haptic representation of the three-dimensional environment includes information about said features found in the environment;
wherein said appendage is a finger and the image sensing device is mounted on the dorsal aspect of said finger;
wherein the act of gathering image data comprises waving the finger in three-dimensions within the environment to recognize the three-dimensional object;
wherein the act of gathering image data further comprises waving a second image sensing device mounted on a dorsal aspect of a second finger in three-dimensions within the environment to recognize a second three-dimensional object, wherein the first and second image sensing devices are waved simultaneously.

30. The method of claim 29, wherein the first and second image sensing devices are mounted on different fingers of the same hand, and are waved simultaneously by waving the hand in three-dimensions.

31. The method of claim 15, further comprising moving the finger to operate the three-dimensional object.

32. The method of claim 31, wherein the movement of the finger comprises a downward movement, an upward movement, or a rotational movement.

33. The method of claim 32, wherein the downward or upward movement of the finger comprises bending or pivoting of the finger down or up.

34. The method of claim 32, wherein the rotational movement comprises turning of a hand comprising the finger.

35. The system of claim 1, wherein the controller is configured to control movement of the recognized object in three-dimensions.

36. The system of claim 1, wherein the recognized object comprises a mechanical or electrical device, and the controller operates the mechanical or electrical device.

37. A visual sensing and tactile stimulation system, comprising:
a first image sensing device which transmits image data corresponding to a three-dimensional object in an environment surrounding a user;
a first haptic stimulator associated with said first image sensing device; and
a computer vision system in communication with said first image sensing device and first haptic stimulator, wherein said computer vision system receives the image data from said first image sensing device and sends a first signal to said first haptic stimulator when said received image data corresponds to a first recognized three-dimensional object, wherein said haptic stimulator is adapted to provide a haptic stimulus after receipt of said first signal from said computer vision system; and a second image sensing device which transmits image data corresponding to a second three-dimensional object in the environment surrounding the user, wherein the computer vision system is in communication with the second image sensing device and a second haptic stimulator, wherein said computer vision system receives image data from said second image sensing device and said first image sensing device simultaneously, and sends a signal to said second haptic stimulator when said received image data corresponds to a second recognized three-dimensional object, and wherein the second haptic stimulator is adapted to provide a haptic stimulus after receipt of said signal from said computer vision system.

38. The system of claim 37, wherein the first three-dimensional object and the second three-dimensional object are at different locations within the environment.

39. The system of claim 3, wherein the predetermined three-dimensional object is recognized based on its three-dimensional shape.

40. The system of claim 3, wherein the image sensing device comprises a laser configured to illuminate the three-dimensional objects and a phototransister configured to receive reflected light from the three-dimensional objects, wherein the reflected light is produced in response to the illumination.

41. The system of claim 40, wherein the haptic stimulator is attached to the laser and comprises a coil and a plurality of magnets.

* * * * *